A. M. LAYCOCK.
ROLLER BEARING.
APPLICATION FILED APR. 18, 1916.

1,247,289.   Patented Nov. 20, 1917.

Witnesses
G. T. Baker
H. P. Jennings

Inventor
Arthur M. Laycock
by Foster Freeman Watson & Coit
Attorneys

UNITED STATES PATENT OFFICE.

ARTHUR M. LAYCOCK, OF KINGSTON, PENNSYLVANIA.

ROLLER-BEARING.

1,247,289.      Specification of Letters Patent.   Patented Nov. 20, 1917.

Original application filed April 18, 1916, Serial No. 91,989. Divided and this application filed April 18, 1916. Serial No. 91,990.

*To all whom it may concern:*

Be it known that I, ARTHUR M. LAYCOCK, a subject of the King of Great Britain, residing at Kingston, county of Luzerne, State of Pennsylvania, have invented certain new and useful Improvements in Roller-Bearings, of which the following is a specification.

The invention relates to roller bearings. Its principal objects are to provide a simple means whereby the bearings may be assembled and the rollers held in position against axial displacement. Other objects will appear from the following description.

The bearing comprises inner and outer rings with interposed rollers. These rollers are prevented from axial displacement by suitable means which includes a split contractible ring carried by the inner ring.

This application is a division of my application Serial No. 91,989 filed April 18, 1916.

The various features of the invention will be understood from an inspection of the accompanying drawing, in which, Figure 1 is an end elevation with part of the inner ring broken away to show the contractible split ring;

Figure 1:
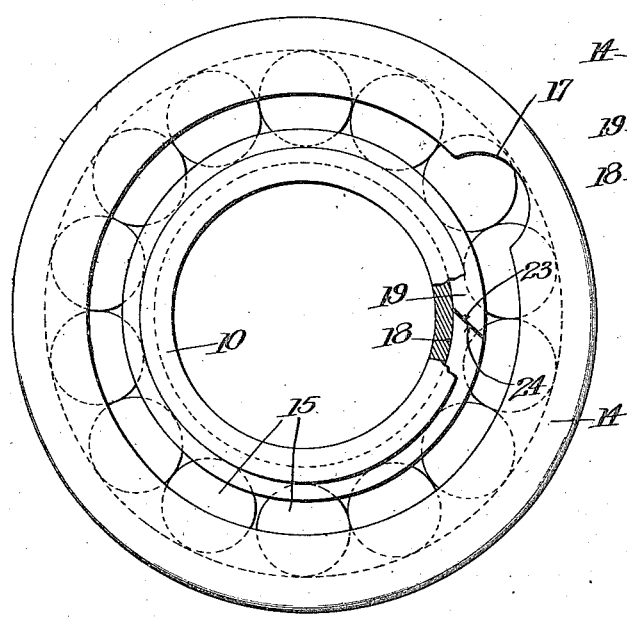
Figure 2:
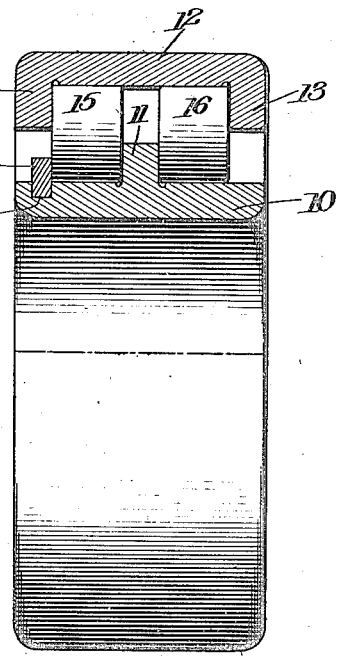
Fig. 2 is a half side elevation and half sectional view.
Figure 3:
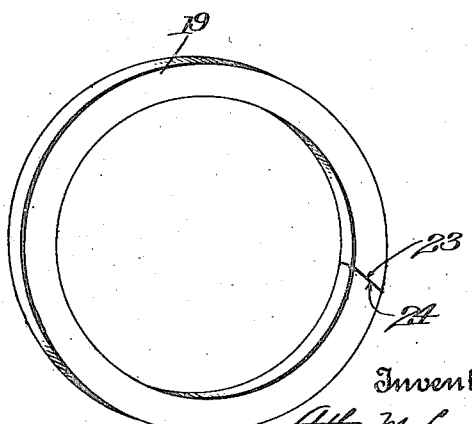
Fig. 3 is a perspective view of the split ring.

The bearing comprises an inner ring 10 and an outer ring 12. As shown, the bearing is of the two row type, although the invention is applicable to other types. The inner ring is provided with a medially located outwardly extending radial flange 11, and the outer ring may be provided with an inwardly extending radial flange 13, 14 at each end. Interposed between the flanges 11, 13, 14 are two rows of roller bearings 15, 16.

One of the flanges in the outer ring, as 14, is provided with an opening 17. This opening is for the purpose of passing the rollers into or out of the bearing and may be of any shape that will accomplish this result. In Fig. 1 this opening is shown as arcuate, being substantially semi-circular in outline. In the inner ring and opposite the flange 14 a groove or slot 18 is formed, adapted to receive and seat a contractible split ring 19. As shown, the split ring projects above the periphery of the inner bearing ring, and its inner face is in the same plane as the inner face of flange 14. Thus it forms an abutment for the ends of the rollers 15 and blocks the opening 17 against egress of the rollers. When the split ring is in the groove 18, the ends 23, 24, thereof, abut. Thus the ring is continuous, and the face presented to the ends of the rollers is smooth and without interruptions.

In assembling the bearing the row of rollers 16 and inner and outer rings are put together in the usual way. The row of rollers 15 is put in place by inserting the rollers one by one through the opening 17 and pushing them around in the bearing race-way. When all of the rollers 15 are in place, split ring 19 is expanded to slip over the inner ring, and is pushed inward until it seats in the groove or slot 18, with its ends 23, 24, abutting, and thus preventing any of the rollers 15 from slipping out of opening 17.

From the above description it is apparent that the device provides a very simple and expeditious means for assembling roller bearings.

Having thus described the invention, what is claimed and desired to be secured by Letters Patent is:

In a roller bearing, an inner ring, an outer ring, interposed cylindrical rollers having flat ends, means for preventing axial displacement of said rollers including a flange carried by the outer of said rings, said flange formed with an opening through which the rollers may be inserted and having a flat surface in contact with an end of the rollers, the inner ring being formed with a groove opposite said flange and a split ring seated in said groove and having a flat surface abutting the said end of the rollers for preventing egress of the same through said opening.

In testimony whereof I affix my signature.

ARTHUR M. LAYCOCK.